United States Patent
Hirota

(10) Patent No.: US 7,349,946 B2
(45) Date of Patent: Mar. 25, 2008

(54) INFORMATION PROCESSING SYSTEM

(75) Inventor: Makoto Hirota, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 747 days.

(21) Appl. No.: 09/966,902

(22) Filed: Sep. 28, 2001

(65) Prior Publication Data
US 2002/0039098 A1    Apr. 4, 2002

(30) Foreign Application Priority Data
Oct. 2, 2000    (JP)    ............................ 2000-302761
Oct. 2, 2000    (JP)    ............................ 2000-302762

(51) Int. Cl.
*G06F 15/16*    (2006.01)
(52) U.S. Cl. ...................... 709/207; 709/217; 709/231
(58) Field of Classification Search ................ 709/208, 709/200, 207, 217, 231; 345/473, 706; 715/839; 725/134; 719/318; 704/260
See application file for complete search history.

(56) References Cited

U.S. PATENT DOCUMENTS

| | | | | |
|---|---|---|---|---|
| 5,555,343 A * | 9/1996 | Luther | ........................ | 704/260 |
| 5,614,940 A * | 3/1997 | Cobbley et al. | ............ | 725/138 |
| 5,754,172 A * | 5/1998 | Kubota et al. | ........... | 715/500.1 |
| 5,915,001 A * | 6/1999 | Uppaluru | ................ | 379/88.22 |
| 6,016,158 A * | 1/2000 | Mackinnon | .................... | 725/9 |
| 6,018,710 A * | 1/2000 | Wynblatt et al. | ........... | 704/260 |
| 6,061,056 A * | 5/2000 | Menard et al. | ............. | 715/704 |
| 6,085,235 A * | 7/2000 | Clarke et al. | ................ | 709/219 |
| 6,112,177 A * | 8/2000 | Cosatto et al. | ............... | 704/260 |
| 6,115,686 A * | 9/2000 | Chung et al. | ................ | 704/260 |
| 6,181,351 B1 * | 1/2001 | Merrill et al. | ............... | 345/473 |
| 6,208,359 B1 * | 3/2001 | Yamamoto | ................... | 345/473 |
| 6,243,676 B1 * | 6/2001 | Witteman | .................... | 704/243 |
| 6,263,507 B1 * | 7/2001 | Ahmad et al. | ............... | 725/134 |
| 6,271,841 B1 * | 8/2001 | Tsujimoto | .................... | 715/839 |
| 6,370,535 B1 * | 4/2002 | Shapiro et al. | ............. | 707/100 |
| 6,433,784 B1 * | 8/2002 | Merrick et al. | .............. | 345/473 |
| 6,476,815 B1 * | 11/2002 | Ando | .......................... | 345/473 |
| 6,532,498 B1 * | 3/2003 | Hager et al. | ................. | 719/318 |
| 6,587,822 B2 * | 7/2003 | Brown et al. | ............... | 704/275 |
| 6,616,700 B1 * | 9/2003 | Thum et al. | ............. | 715/500.1 |
| 6,714,909 B1 * | 3/2004 | Gibbon et al. | ............. | 704/246 |
| 6,745,163 B1 * | 6/2004 | Brocious et al. | ............ | 704/260 |
| 6,785,649 B1 * | 8/2004 | Hoory et al. | ................ | 704/235 |
| 6,885,734 B1 * | 4/2005 | Eberle et al. | ............ | 379/88.01 |
| 7,024,677 B1 * | 4/2006 | Snyder et al. | ................. | 725/86 |
| 7,035,848 B2 * | 4/2006 | Shapiro et al. | ................. | 707/5 |
| 7,058,694 B1 * | 6/2006 | De Bonet et al. | ........... | 709/217 |
| 7,072,932 B1 * | 7/2006 | Stahl | .......................... | 709/203 |
| 2001/0027398 A1 * | 10/2001 | Kohno | ........................ | 704/275 |

* cited by examiner

*Primary Examiner*—William Vaughn
*Assistant Examiner*—Kristie D Shingles
(74) *Attorney, Agent, or Firm*—Morgan & Finnegan, LLP

(57) ABSTRACT

The system includes a computer for transmitting news information and a computer communicably connected to the computer for receiving the news information. The computer outputs the content of the news information as voice in an order predetermined based upon the content of the received news information, and displays an animation, which imitates a speaking individual, in conformity with the voice output. The user is thus capable of acquiring desired news information with facility.

7 Claims, 28 Drawing Sheets

FIG. 7

| GENRE NO. | GENRE NAME | CONTENT |
|---|---|---|
| 1 | POLITICS | HEADLINE : OPPOSITION PARTY REACTS TO PRIME MINISTER'S ANNOUNCEMENT OF TAX-REDUCTION POLICY<br>TEXT : PRIME MINISTER ×××ANNOUNCED THAT A "SUBSTANTIAL TAX-CUT" WOULD BE PUT INTO FORCE NEXT YEAR...<br><br>HEADLINE : SIGNS OF HIGHER VOTER TURNOUT FOR UPPER-HOUSE ELECTION<br>TEXT : UNPRECEDENTED VOTER TURNOUT FOR THE CURRENT UPPER-HOUSE ELECTIO HAS BECOME THE FOCUS OF INTEREST...<br>... |
| 2 | BUSINESS | HEADLINE : WHOLESALE PRICE INDEX UNCHANGED FROM LAST MONTH<br>TEXT : THE WHOLESALE PRICE INDEX FOR JUNE ANNOUNCED ON THE 8TH BY THE BANK OF JAPAN...<br><br>HEADLINE : YEN AT 139¥ LEVEL IN TOKYO<br>TEXT : THE YEN QUOTE ON THE TOKYO FOREIGN EXCHANGE MARKET ON THE 8TH WAS 139¥/DOLLAR AT 5:00 PM...<br>... |
| 3 | SPORTS | HEADLINE : FRANCE AND BRAZIL IN FINALS<br>TEXT : THE SOCCER WORLD-CUP MEET IN FRANCE ON THE 8TH....<br><br>HEADLINE : FINAL GAME OF JAPAN-US COLLEGE BASEBALL RAINED OUT<br>TEXT : IN TUCSON, ARIZONA, IN THE AFTERNOON ON THE 8TH....<br>... |
| 4 | WEATHER | AREA : NATIONWIDE<br>WHEN : TONIGHT @@ TOMORROW @@ DAY AFTER TOMORROW<br>WEATHER : SAPPORO @@ CLOUDY, INTERMITTENT RAIN @@ RAIN, LATER CLOUDY @@ RAIN, LATER PARTLY SUNNY<br>WEATHER : SENDAI @@ CLOUDY @@ CLOUDY @@ CLOUDY WITH SUN AT TIMES<br>WEATHER : NIIGATA @@ CLOUDY @@ RAIN @@ CLOUDY WITH RAIN AT TIMES<br>WEATHER : TOKYO @@ FAIR, LATER CLOUDY @@ CLOUDY, LATER FAIR @@ CLOUDY... |

FIG. 8

| GENRE NO. | GENRE NAME | CONTENT |
|---|---|---|
| 1 | POLITICS | HEADLINE : OPPOSITION PARTY REACTS TO PRIME MINISTER'S ANNOUNCEMENT OF TAX-REDUCTION POLICY<br>TEXT : PRIME MINISTER ××× ANNOUNCED THAT A "SUBSTANTIAL TAX-CUT" WOULD BE PUT INTO FORCE NEXT YEAR...<br><br>HEADLINE : SIGNS OF HIGHER VOTER TURNOUT FOR UPPER-HOUSE ELECTION<br>TEXT : UNPRECEDENTED VOTER TURNOUT FOR THE CURRENT UPPER-HOUSE ELECTIO HAS BECOME THE FOCUS OF INTEREST...<br>... |
| 2 | BUSINESS | HEADLINE : WHOLESALE PRICE INDEX UNCHANGED FROM LAST MONTH<br>TEXT : THE WHOLESALE PRICE INDEX FOR JUNE ANNOUNCED ON THE 8TH BY THE BANK OF JAPAN...<br><br>HEADLINE : YEN AT 139¥ LEVEL IN TOKYO<br>TEXT : THE YEN QUOTE ON THE TOKYO FOREIGN EXCHANGE MARKET ON THE 8TH WAS 139¥/DOLLAR AT 5:00 PM...<br>... |
| 3 | SPORTS | HEADLINE : FRANCE AND BRAZIL IN FINALS<br>TEXT : THE SOCCER WORLD-CUP MEET IN FRANCE ON THE 8TH...<br><br>HEADLINE : MARK M$^C$GWYER'S 25$^{TH}$ OF THE SEASON<br>TEXT : IN THE AMERICAN LEAGUE, INFIELDER MARK M$^C$GWYER OF THE CARDINALS...<br>... |
| 4 | WEATHER | AREA : NATIONWIDE<br>WHEN : TONIGHT @@ TOMORROW @@ DAY AFTER TOMORROW<br>WEATHER : SAPPORO @@ CLOUDY, INTERMITTENT RAIN @@ RAIN, LATER CLOUDY @@ RAIN, LATER PARTLY SUNNY<br>WEATHER : SENDAI @@ CLOUDY @@ CLOUDY @@ CLOUDY WITH SUN AT TIMES<br>WEATHER : NIIGATA @@ CLOUDY @@ RAIN @@ CLOUDY WITH RAIN AT TIMES<br>WEATHER : TOKYO @@ FAIR, LATER CLOUDY @@ CLOUDY, LATER FAIR @@ CLOUDY... |

FIG. 9

| GENRE NO. | GENRE NAME | CONTENT |
|---|---|---|
| 3 | SPORTS | HEADLINE : MARK M<sup>C</sup>GWYER'S 25<sup>TH</sup> OF THE SEASON<br>TEXT : IN THE AMERICAN LEAGUE, INFIELDER MARK M<sup>C</sup>GWYER OF THE CARDINALS HIT A GRAND-SLAM HOME RUN, WHICH WAS HIS 25<sup>TH</sup> HOME RUN OF THE SEASON, IN THE 1<sup>ST</sup> INNING OF A GAME AGAINST THE YANKEES HELD IN ST. LOUIS ON THE 16<sup>TH</sup>. THIS IS THE FIRST TIME IN HISTORY THAT 25<sup>TH</sup> HOME RUNS HAVE BEEN HIT BY THE END OF MAY. THE MOST HOMERS HIT HERETOFORE WERE 24 BOTH BY KEN GRIFFEY AND M<sup>C</sup>GWYER LAST YEAR. THE INFIELDER HAS NOW HIT NINE HOME RUNS IN HIS LAST SEVEN GAMES. AT THIS PACE HE WILL HIT 83 HOMERS THIS YEAR. |

FIG. 10

```
TENNIS
THE BRITISH OPEN
THE AUSTRALIAN OPEN
THE FRENCH OPEN
THE U.S. OPEN
SAMPRAS
HINGUS
PROFESSIONAL BASEBALL
MAJOR LEAGUES
M^CGWYER
SOSA
SOCCER
J LEAGUE
WORLD CUP
```

F I G. 11
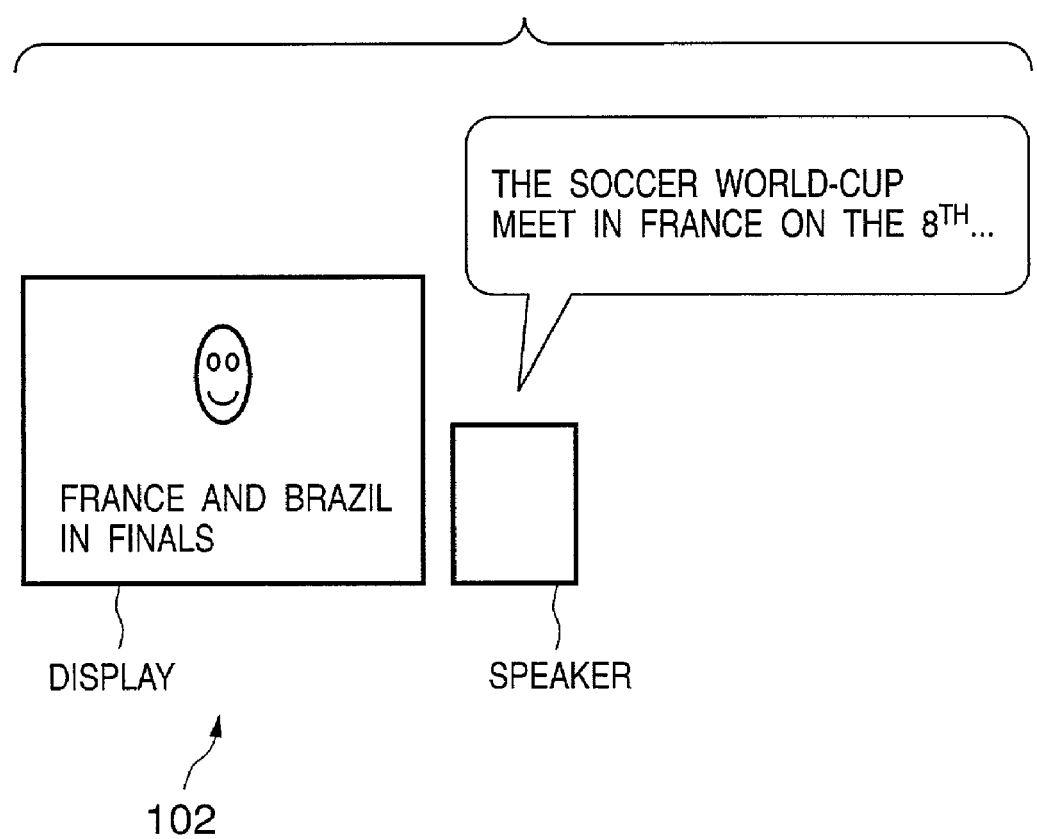

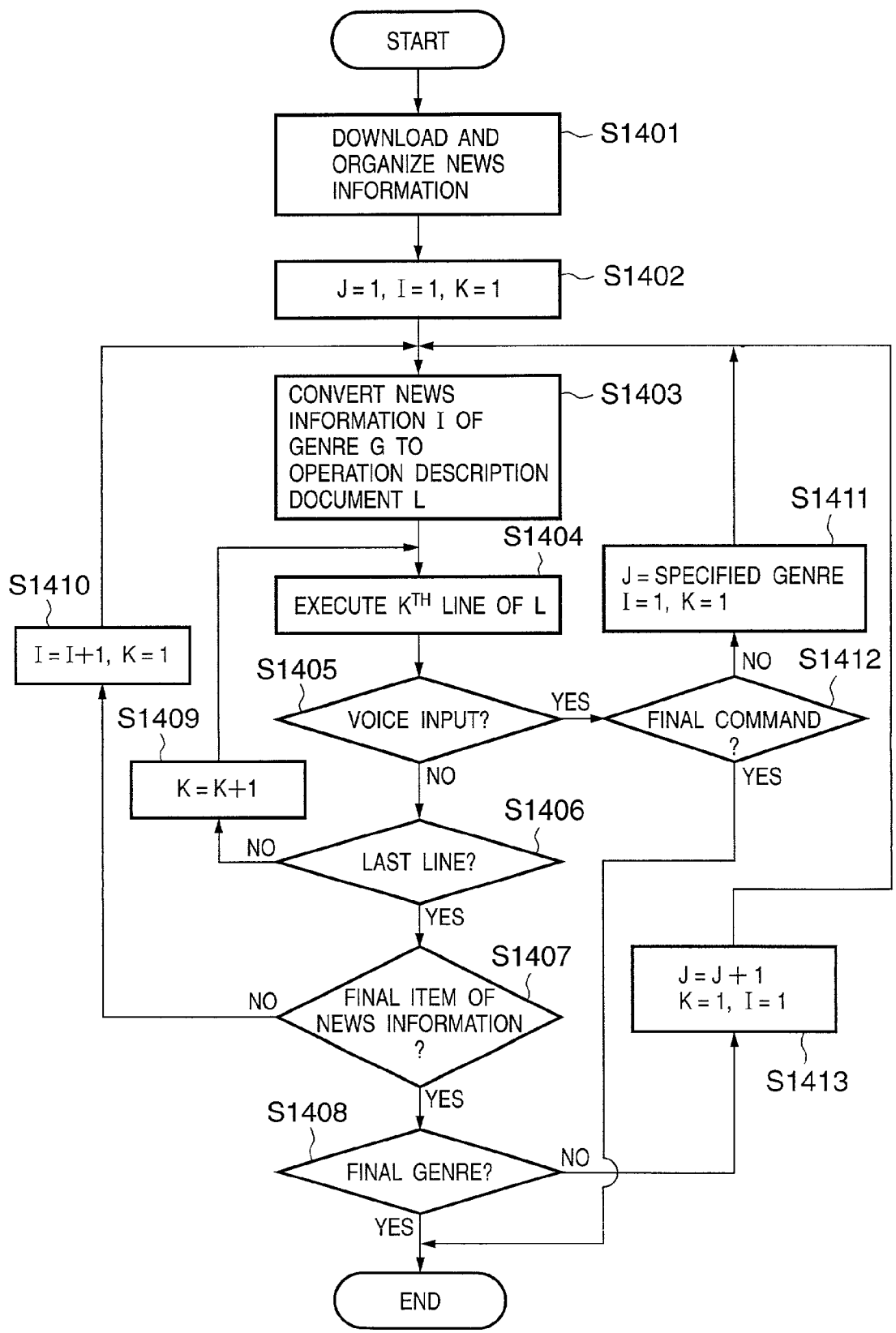

FIG. 17

| GENRE NO. | GENRE NAME | CONTENT |
|---|---|---|
| 1 | POLITICS | HEADLINE : OPPOSITION PARTY REACTS TO PRIME MINISTER'S ANNOUNCEMENT OF TAX-REDUCTION POLICY<br>TEXT : PRIME MINISTER ××× ANNOUNCED THAT A "SUBSTANTIAL TAX-CUT" WOULD BE PUT INTO FORCE NEXT YEAR...<br><br>HEADLINE : SIGNS OF HIGHER VOTER TURNOUT FOR UPPER-HOUSE ELECTION<br>TEXT : UNPRECEDENTED VOTER TURNOUT FOR THE CURRENT UPPER-HOUSE ELECTIO HAS BECOME THE FOCUS OF INTEREST...<br>... |
| 2 | BUSINESS | HEADLINE : WHOLESALE PRICE INDEX UNCHANGED FROM LAST MONTH<br>TEXT : THE WHOLESALE PRICE INDEX FOR JUNE ANNOUNCED ON THE 8$^{TH}$ BY THE BANK OF JAPAN...<br><br>HEADLINE : YEN AT 139¥ LEVEL IN TOKYO<br>TEXT : THE YEN QUOTE ON THE TOKYO FOREIGN EXCHANGE MARKET ON THE 8$^{TH}$ WAS 139¥/DOLLAR AT 5:00 PM...<br>... |
| 3 | SPORTS | HEADLINE : FRANCE AND BRAZIL IN FINALS<br>TEXT : THE SOCCER WORLD-CUP MEET IN FRANCE ON THE 8$^{TH}$...<br><br>HEADLINE : FINAL GAME OF JAPAN-US COLLEGE BASEBALL RAINED OUT<br>TEXT : IN TUCSON, ARIZONA, IN THE AFTERNOON ON THE 8$^{TH}$...<br>... |
| 4 | WEATHER | AREA : NATIONWIDE<br>WHEN : TONIGHT @@ TOMORROW @@ DAY AFTER TOMORROW<br>WEATHER : SAPPORO @@ CLOUDY, INTERMITTENT RAIN @@ RAIN, LATER CLOUDY @@ RAIN, LATER PARTLY SUNNY<br>WEATHER : SENDAI @@ CLOUDY @@ CLOUDY WITH SUN AT TIMES<br>WEATHER : NIIGATA @@ CLOUDY @@ RAIN @@ CLOUDY WITH RAIN AT TIMES<br>WEATHER : TOKYO @@ FAIR, LATER CLOUDY @@ CLOUDY, LATER FAIR @@ CLOUDY... |

FIG. 18

```
< caster >
name = mainCaster
file = mainCaster.agt
< /caster >

< caster >
name = WeatherCaster
file = WeatherCaster.agt
< /caster >

< caster >
name = WeatherCaster
file = WeatherCaster.agt
< /caster >
```

FIG. 19

```
< image >
name = Default
file = Default.bmp
< /image >

< image >
name = Weather
file = Weather.bmp
< /image >
```

FIG. 20

```
< newsgenre >
name = POLITICS
Caster = mainCaster
image = Default
< /newsgenre >

< newsgenre >
name = BUSINESS
Caster = mainCaster
image = Default
< /newsgenre >

< newsgenre >
name = SPORTS
Caster = SportsCaster
image = Default
< /newsgenre >

< newsgenre >
name = WEATHER
Caster = WeatherCaster
image = Weather
< /newsgenre >
```

F I G. 21

```
< schedule >
POLITICS
BUSINESS
SPORTS
WEATHER
< /schedule >
```

FIG. 22

```
< recognize >
1 : POLITICS
2 : BUSINESS
3 : SPORTS
4 : WEATHER
5 : THANK YOU
< /recognize >

< reaction >
1 : genre change : POLITICS
2 : genre change : BUSINESS
3 : genre change : SPORTS
4 : genre change : WEATHER
5 : end
< /reaction >
```

FIG. 23

```
Caster — > Show(mainCaster)
BackgroundImage — > Display(Default)
FrontText — > Display(OPPOSITION PARTY REACTS TO PRIME MINISTER'S
              ANNOUNCEMENT OF TAX-REDUCTION POLICY)
Caster — > Speak(PRIME MINISTER ——— ANNOUNCED THAT A
              "SUBSTANTIAL TAX-CUT" WOULD BE PUT INTO
              FORCE NEXT YEAR...)
....

....

FrontText — > Display(SIGNS OF HIGHER VOTER TURNOUT FOR
              UPPER-HOUSE ELECTION)
Caster — > Speak (UNPRECEDENTED VOTER TURNOUT FOR THE CURRENT
              UPPER-HOUSE ELECTION HAS BECOME THE FOCUS
              OF INTEREST...)
```

INFORMATION PROCESSING SYSTEM

FIELD OF THE INVENTION

This invention relates to information processing and, more particularly, to the processing of information relating to news such as events in the world.

BACKGROUND OF THE INVENTION

Various methods have been proposed for conveying flow information to users, an example of such information being news articles that change from one minute to the next. One example of such a method of providing information that has long been in use and is widely popular is a TV or radio news program.

Such methods convey information to the user by having a newscaster read from a news manuscript. In the case of TV, video is used to furnish information more effectively.

New means of providing information have become possible through the development of communication techniques such as computers and the Internet, and these means include Web pages that publish the latest news and services that distribute news by electronic mail.

A TV or radio news program, however, is delivered at fixed broadcast times and the order in which the content of news is reported is decided on the broadcast-station side. This format lacks a news-on-demand feature that allows information to be acquired whenever desired and an interactive feature that allows an audience to specify desired information in accordance with a particular news genre.

On the other hand, provision of news by a Web page that carries news articles or by a news service that relies upon electronic mail poses a problem for individuals who do not possess computer operating skills. In addition, the information supplied is provided in the form of text. In order to acquire this information, therefore, one must direct one's attention toward the computer screen and read the text. This approach lacks the kind of user friendliness that would allow one to acquire information while doing housework or driving, for example.

SUMMARY OF THE INVENTION

Accordingly, an object of the present invention is to make it possible for a user to acquire desired news-related information in a simple manner.

According to the present invention, there is provide an information processing system comprising a transmitting apparatus for transmitting news information, and a receiving apparatus communicably connected to said transmitting apparatus for receiving the news information, wherein said receiving apparatus includes:

voice output means for outputting the content of the received news information as voice in an order predetermined based upon the content of the news information; and display means for displaying an animation, which imitates a speaking individual, in conformity with the output of said voice.

According to the present invention, there is also provided a receiving apparatus, which is communicably connected to a transmitting apparatus that transmits news information, for receiving the news information from said transmitting apparatus, comprising:

voice output means for outputting the content of the received news information as voice in an order predetermined based upon the content of the news information; and display means for displaying an animation, which imitates a speaking individual, in conformity with the output of said voice.

According to the present invention, there is also provided an information processing method comprising:

a step of transmitting news information via a communication path;

a step of receiving the news information;

a voice output step of outputting the content of the received news information as voice in an order predetermined based upon the content of the news information; and a display step of displaying an animation, which imitates a speaking individual, in conformity with the output of said voice.

According to the present invention, there is also provided an information processing method comprising:

a step of receiving, via a communication path, news information from a transmitting apparatus that transmits the news information;

a voice output step of outputting the content of the received news information as voice in an order predetermined based upon the content of the news information; and a display step of displaying an animation, which imitates a speaking individual, in conformity with the output of said voice.

According to the present invention, there is also provided a program for causing a computer to function as the following means, wherein said computer, which is communicably connected to a transmitting apparatus that transmits news information, receives the news information from said transmitting apparatus:

voice output means for outputting the content of the received news information as voice in an order predetermined based upon the content of the news information; and display means for displaying an animation, which imitates a speaking individual, in conformity with the output of said voice.

According to the present invention, there is also provided an information processing system having a first communication apparatus for transmitting news information, and a second communication apparatus communicably connected to said first communication apparatus for receiving the news information from said first communication apparatus, wherein said second communication apparatus includes:

voice output means for outputting the content of the received news information as voice;

display means for displaying an animation, which imitates a speaking individual, in conformity with the output of said voice; and acceptance means for accepting a designation of type of the news information by voice;

wherein said voice output means outputs content of the news information, which belongs to the designated type, as voice preferentially.

According to the present invention, there is also provided an information processing system having a first communication apparatus for transmitting news information, and a second communication apparatus communicably connected to said first communication apparatus for receiving the news information from said first communication apparatus, wherein said second communication apparatus includes:

voice output means for outputting the content of the received news information as voice;

display means for displaying an animation, which imitates a speaking individual, in conformity with the output of said voice;

acceptance means for accepting a designation of type of the news information by voice; and notification means for notifying said first communication apparatus of the type of news information designated;

wherein said first communication apparatus transmits the news information, which belongs to the designated type of which it has been notified by said second communication apparatus, to said second communication apparatus preferentially.

According to the present invention, there is also provided a communication apparatus, which is communicably connected to a transmitting apparatus that transmits news information, for receiving the news information from said transmitting apparatus, comprising:

voice output means for outputting the content of the received news information as voice;

display means for displaying an animation, which imitates a speaking individual, in conformity with the output of said voice;

acceptance means for accepting a designation of type of the news information by voice; and notification means for notifying said first communication apparatus of the type of news information designated;

wherein said voice output means outputs content of the news information, which belongs to the designated type, as voice preferentially.

According to the present invention, there is also provided a communication apparatus, which is communicably connected to a transmitting apparatus that transmits news information, for receiving the news information from said transmitting apparatus, comprising:

voice output means for outputting the content of the received news information as voice;

display means for displaying an animation, which imitates a speaking individual, in conformity with the output of said voice;

acceptance means for accepting a designation of type of said news information by voice;

notification means for notifying said communication apparatus of the type of news information designated.

According to the present invention, there is also provided an information processing method comprising:

a step of transmitting news information via a communication path;

a voice output step of outputting the content of the received news information as voice;

a display step of displaying an animation, which imitates a speaking individual, in conformity with the output of said voice; and an acceptance step of accepting a designation of type of the news information by voice;

wherein content of the news information that belongs to the designated type is output as voice preferentially at said voice output step.

According to the present invention, there is also provided an information processing method comprising:

a transmitting step of transmitting news information via a communication path;

a voice output step of outputting the content of the received news information as voice;

a display step of displaying an animation, which imitates a speaking individual, in conformity with the output of said voice;

a step of accepting a designation of type of said news information by voice; and a notification step of notifying the source of transmission of the news information of the type of news information designated;

wherein the news information that belongs to the type designated in said notification step is transmitted preferentially at said transmitting step.

According to the present invention, there is also provided an information processing method comprising:

a step of receiving news information, via a communication path, from a transmitting apparatus that transmits the news information;

a voice output step of outputting the content of the received news information as voice; and a display step of displaying an animation, which imitates a speaking individual, in conformity with the output of the voice;

an acceptance step of accepting a designation of type of said news information by voice; and wherein content of the news information that belongs to the designated type is output as voice preferentially at said voice output step.

According to the present invention, there is also provided an information processing method comprising:

a step of receiving news information, via a communication path, from a transmitting apparatus that transmits the news information;

a voice output step of outputting the content of the received news information as voice;

a display step of displaying an animation, which imitates a speaking individual, in conformity with the output of the voice;

an acceptance step of accepting a designation of type of said news information by voice; and a step of notifying the transmitting apparatus of the type of news information designated.

According to the present invention, there is also provided a program for causing a computer to function as the following means, wherein said computer, which is communicably connected to a transmitting apparatus that transmits news information, receives the news information from said transmitting apparatus:

voice output means for outputting the content of the received news information as voice;

display means for displaying an animation, which imitates a speaking individual, in conformity with the output of the voice; and acceptance means for accepting a designation of type of the news information by voice;

wherein said voice output means outputs content of the news information, which belongs to the designated type, as voice preferentially.

According to the present invention, there is also provided a program for causing a computer to function as the following means, wherein said computer, which is communicably connected to a transmitting apparatus that transmits news information, receives the news information from said transmitting apparatus:

voice output means for outputting the content of the received news information as voice;

display means for displaying an animation, which imitates a speaking individual, in conformity with the output of the voice;

acceptance means for accepting a designation of type of said news information by voice; and means for notifying the transmitting apparatus of the type of news information designated.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a diagram showing an example of news information organized by a default-news management unit according to the first embodiment;

FIG. 8 is a diagram showing an example of news information that has been organized by a fresh-news management unit according to the first embodiment;

FIG. 9 is a diagram showing an example of freshly acquired news information extracted by the fresh-news management unit according to the first embodiment;

FIG. 10 illustrates an example of information representing user interests according to the first embodiment;

FIG. 11 is a diagram illustrating the manner in which the news-subscriber computer provides news information to a user according to the first embodiment;

FIG. 16 is a flowchart illustrating information processing executed by the news-subscriber computer according to the second embodiment;

FIG. 17 is a diagram showing an example of news information that has been organized by a news-article organizing unit according to the second embodiment;

FIG. 18 is a diagram showing an example of a file that defines virtual casters according to the second embodiment;

FIG. 19 is a diagram illustrating an example of a file that defines the background image of an animation according to the second embodiment;

FIG. 20 is a diagram illustrating an example of a file that defines the genre of various items of news information according to the second embodiment;

FIG. 21 is a diagram illustrating an example of a file describing the order of genre of news information provided to a user according to the second embodiment;

FIG. 22 is a diagram illustrating an example of a file that defines recognition vocabulary as well as actions to be taken by a virtual caster in association with each vocabulary item according to the second embodiment;

FIG. 23 is a diagram illustrating an example of an operation description document according to the second embodiment;

DESCRIPTION OF THE PREFERRED EMBODIMENTS

Preferred embodiments of the present invention will now be described in detail in accordance with the accompanying drawings.

First Embodiment

Figure 1:
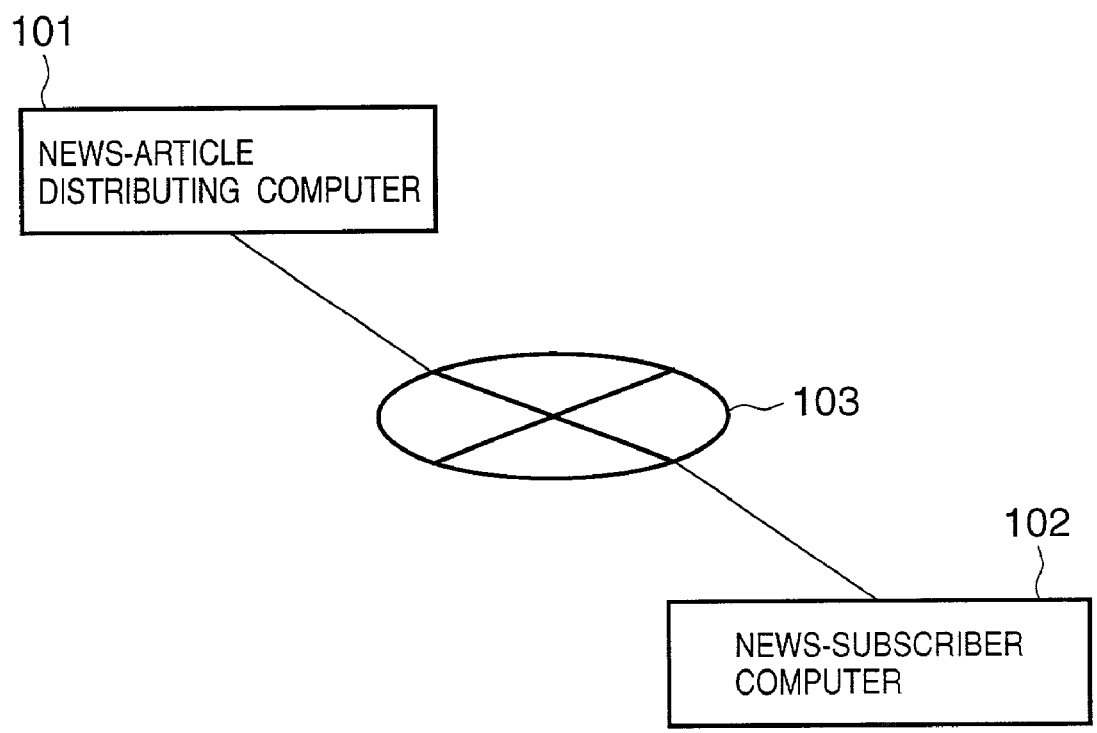
FIG. 1 is a schematic view illustrating an information processing system according to a first embodiment of the present invention.

FIG. 1 is a schematic view illustrating an information processing system according to a first embodiment of the present invention.

The information processing system according to this embodiment comprises a news-article distributing computer 101 for distributing news information, and a news-subscriber computer 102 connected for communication via a communication path 103 such as the Internet for the purpose of receiving distributed news information.

The news-article distributing computer 101 functions as a server for distributing news information. An example is a general-purpose computer having a communication function.

The news-subscriber computer 102 is a computer utilized by the user who receives the distributed news information. This also can be a general-purpose computer having a communication function, or a mobile terminal such as a cellular telephone.

Figure 2:
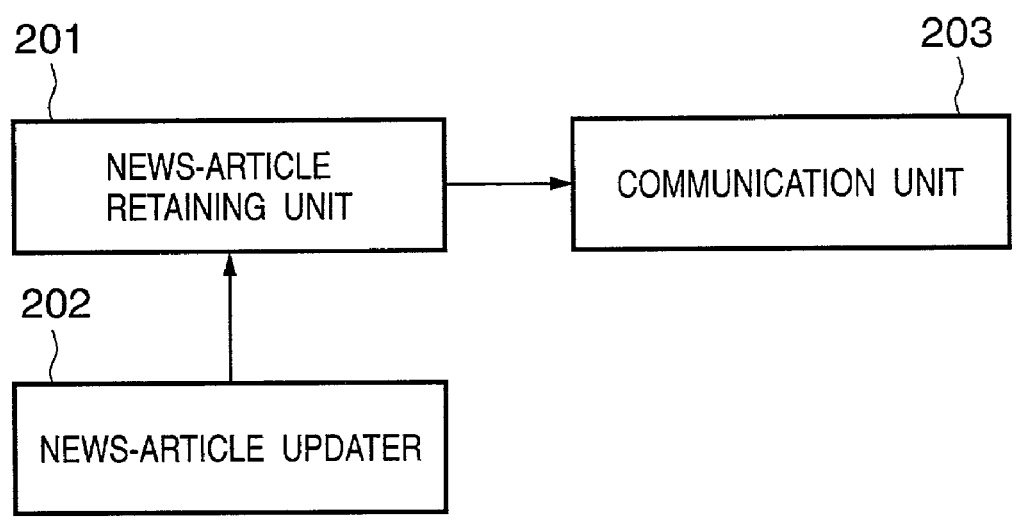
FIG. 2 is a block diagram of functions implemented by a news-article distributing computer according to the first embodiment.

FIG. 2 is a block diagram of functions implemented by the news-article distributing computer 101. The news-article distributing computer 101 includes a news-article retaining unit 201 for retaining news articles provided to the user, a news-article updater 202 for updating, to the latest news information, the news information retained in the news-article retaining unit 201, and a communication unit 203 for transmitting news information retained in the news-article retaining unit 201 to the news-subscriber computer 102 via the communication path 103.

News information that is to be provided is input to the news-article distributing computer 101 by the provider of news information, whereby the input news information is retained in the news-article retaining unit 201 and distributed to the news-subscriber computer 102. The latter can receive this news information at all times by accessing the news-article distributing computer 101.

Figure 3:
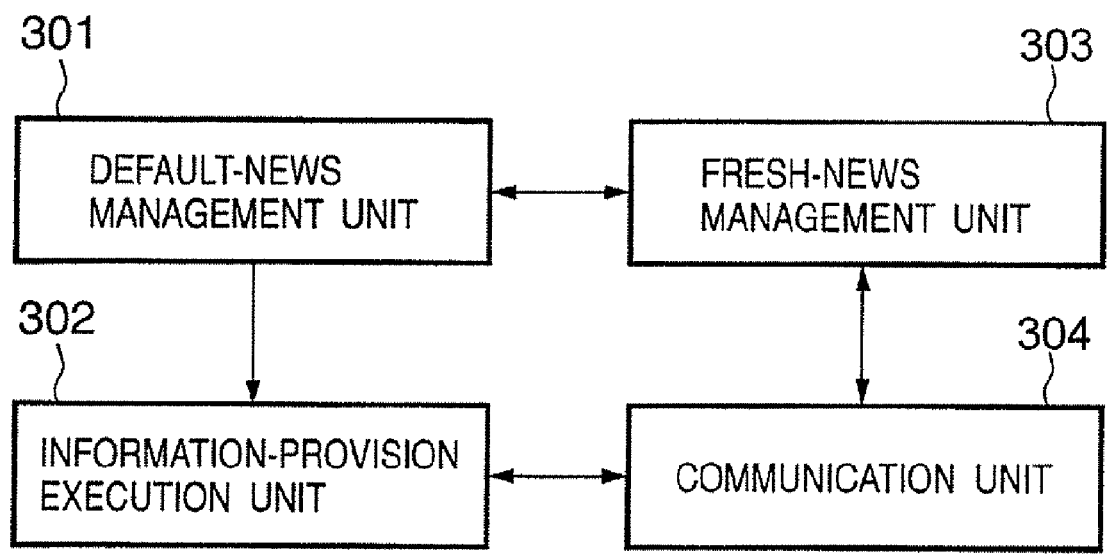
FIG. 3 is a block diagram of functions implemented by a news-subscriber computer according to the first embodiment.

FIG. 3 is a block diagram of functions implemented by a news-subscriber computer 102. The news-subscriber computer 102 includes a default-news management unit 301, an information-provision execution unit 302, a fresh-news management unit 303 and a communication unit 304.

The default-news management unit 301 stores and manages news information received from the news-article distributing computer 101. The received news information is classified and managed based upon its content. In this embodiment, news information is managed by genre, examples of which are politics, business, sports and weather.

The information-provision execution unit 302 outputs the content of received news information by voice and, in conformity with the voice output, displays an animation representing the speaker, such as a newscaster, and displays subtitles and background, etc. In a case where news information has been distributed in a form other than voice data, e.g., as data in a text format, processing for converting this data to voice data also is executed.

By outputting the content of news information in voice form, the user is capable of recognizing the news information as voice and need not read text. This makes it possible to obtain information in a very easy manner while doing housework or while driving, by way of example.

The communication unit 304 executes communication processing for accessing the news-article distributing computer 101 via the communication path 103 and receiving news information.

The fresh-news management unit 303 accesses the news-article distributing computer 101 periodically via the communication unit 304, extracts, from news information that is received, fresh news information that is news information other than that received in the past, i.e., other than news information already retained in the default-news management unit 301, and retains this fresh information temporarily. The extracted fresh news information is subsequently delivered to the default-news management unit 301.

Figure 4:
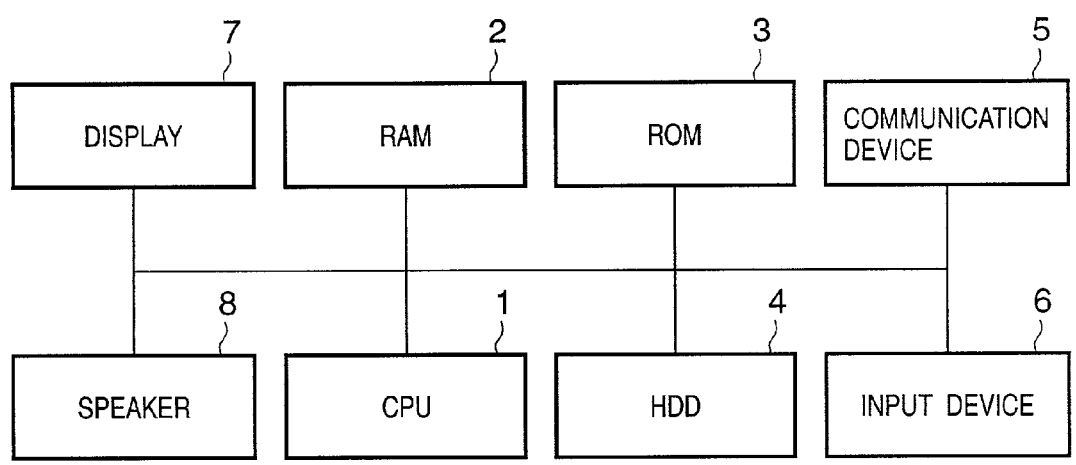
FIG. 4 is a block diagram showing a hardware implementation of the news-subscriber computer according to the first embodiment.

FIG. 4 is a block diagram showing a hardware implementation of the news-subscriber computer 102. As mentioned above, the news-subscriber computer 102 can be a general-purpose computer. As shown in FIG. 4, the news-subscriber computer 102 can include a CPU 1, a RAM 2, a ROM 3 in which the operating program of the CPU 1 has been stored, a hard-disk drive (HDD) 4, a communication device 5 inclusive of a modem or the like for implementing a communication function, an input device 6 such as a keyboard or mouse, a display 7 such as a CRT, and a speaker 8 for outputting voice.

If the function blocks of FIG. 3 and the hardware configuration of FIG. 4 are compared, it will be understood that the default-news management unit 301 can be implemented by the CPU 1 and HDD 4 (which stores received news information), the information-provision execution unit 302 can be implemented by the CPU 1, display 7 (which displays an animation) and speaker 8 (which outputs voice), the communication unit 304 can be implemented by the CPU 1 and communication device 5, and the fresh-news management unit 303 can be implemented by the CPU 1 and RAM 2 (which stores fresh news information temporarily).

Figure 5:
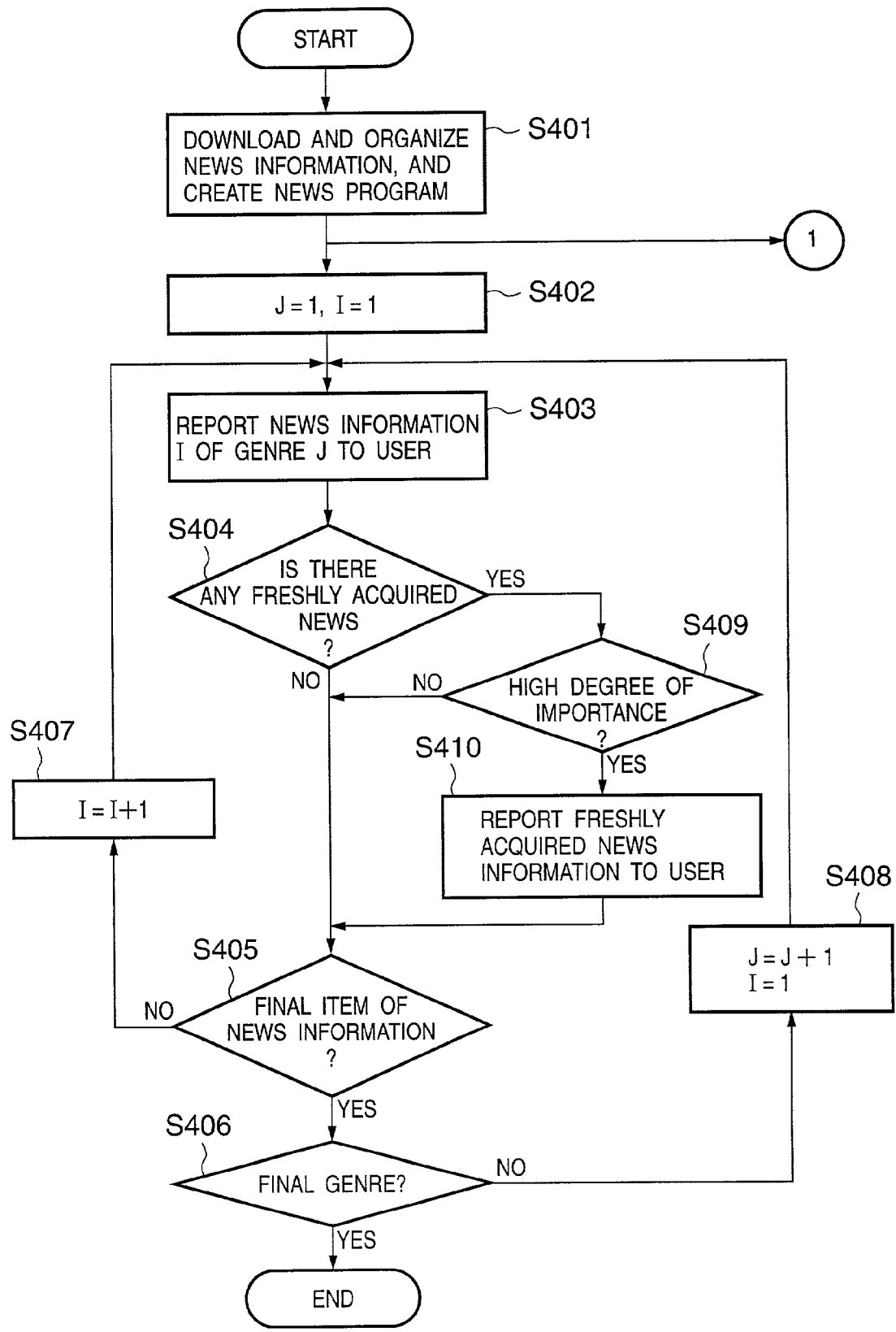
FIG. 5 is a flowchart illustrating information processing executed by the news-subscriber computer according to the first embodiment.

FIG. 5 is a flowchart illustrating information processing executed by the news-subscriber computer 102.

When execution of processing is specified by the user, first the news-subscriber computer 102 communicates with the news-article distributing computer 101 and downloads news information. The news information that has been downloaded is stored upon being organized by the default-news management unit 301 in the form shown in FIG. 7 in accordance with the particular genre of this information (step S401). Each genre is assigned a genre number, as shown in FIG. 7. The genre numbers indicate the sequence in which news information is provided to the user. In the case of this embodiment, therefore, news information relating to the field of politics is provided to the user first. It is possible to adopt an arrangement in which the genre numbers and classification of genre are set appropriately by the user, and the user can ascertain these in numerical order from news information in which the user is interested.

Next, as will be described later, news information is provided to the user by the information-provision execution unit 302 and, at the same time, processing for managing freshly acquired news by the fresh-news management unit 303 is started in parallel.

Figure 6:
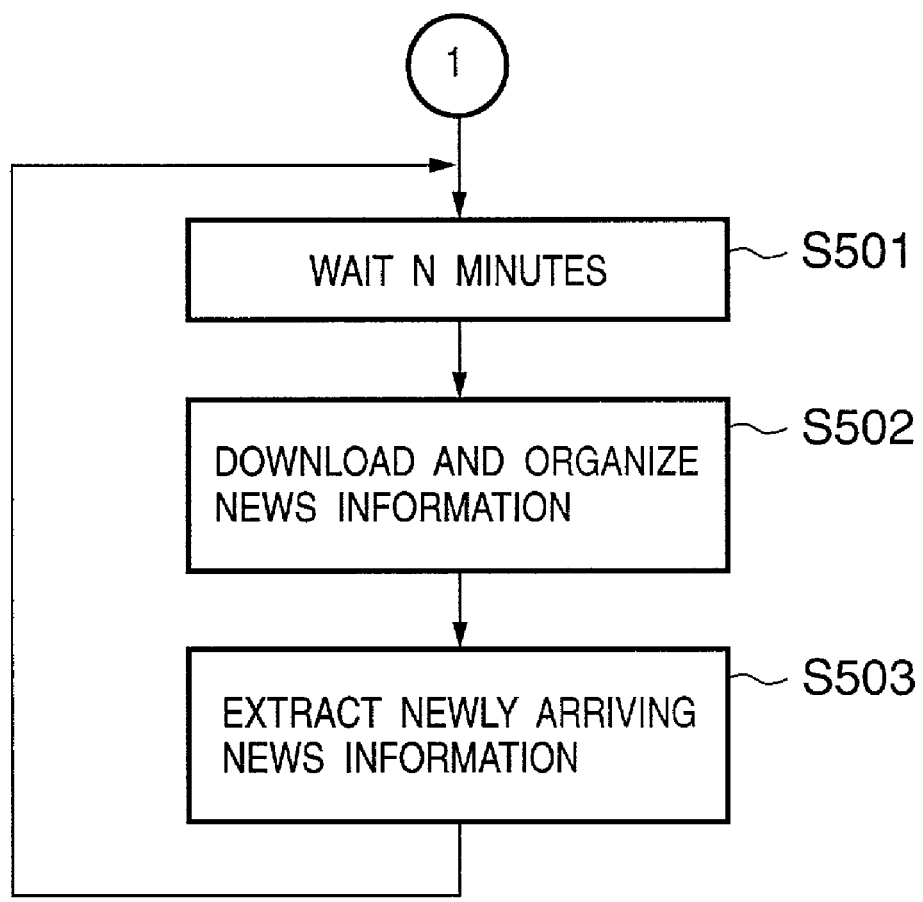
FIG. 6 is a flowchart illustrating processing for managing freshly acquired news according to the first embodiment.

FIG. 6 is a flowchart illustrating processing for managing freshly acquired news. A check of freshly acquired use is made periodically. Here it is assumed that the check is carried out every N minutes. Accordingly, first the system waits N minutes (step S501). Upon elapse of N minutes, the news-subscriber computer 102 access the news-subscriber computer 102 and downloads news information (step S502). The fresh-news management unit 303 manages this news information on a per-genre basis, as shown in FIG. 8.

The fresh-news management unit 303 extracts fresh news information (step S503) by comparing the above news information and already acquired information, which is being managed by the default-news management unit 301, based upon the headlines, by way of example. The news information enclosed by the bold border in FIG. 8 is fresh news information. In this case, only the extracted fresh news information is retained and other news information is deleted, as shown in FIG. 9.

Next, the procedure for providing news information to a user by the information-provision execution unit 302 will be described with reference again to FIG. 5.

First, the information-provision execution unit 302 initializes a variable "J", which is a news-genre number conveyed to the user, and a variable "I", which is an article number assigned for each item of news information (step S402).

The information-provision execution unit 302 posts the news information specified by article I of genre J (step S403). In the case of this embodiment, first the information-provision execution unit 302 would provide the user with news information "Headline: Opposition Party Reacts to Prime Minister's Announcement of Tax-Reduction Policy" of the "Politics" genre in FIG. 7. FIG. 11 illustrates the manner in which the news-subscriber computer 102 provides news information to a user. The content of the news information is output as voice from the speaker, and an animation that imitates a newscaster is displayed on the display to match the voice output. Casters that differ for respective ones of the genre are prepared as animations imitating newscasters and a caster is selected for use upon identifying the genre of each news item. This makes it possible for the user to more easily ascertain the present news genre.

Next, after one item of news information has been posted, the information-provision execution unit 302 checks to see whether the fresh-news management unit 303 has extracted and retained freshly acquired news information (step S404). If there is no freshly acquired news information ("NO" at step S404), then the fresh-news management unit 303 determines whether the above news information is the final item of news information that belongs to genre J (step S405).

If the news information is not the final item of news information ("NO" at step S405), then the information-provision execution unit 302 increments the variable I and proceeds to provide the next item of news information that belongs to the genre J step S407). If the news information is a final item ("YES" at step S405), then the information-provision execution unit 302 determines whether the genre J is the final genre (step S406). If the genre is not the final genre ("NO" at step S406), then the information-provision execution unit 302 increments the variable J, initializes the variable I and proceeds to the next genre (step S408). If the genre is the final genre ("YES" at step S406), then processing is exited.

If it is found at step S404 that the fresh-news management unit 303 has extracted and retained freshly acquired news information, then the information-provision execution unit 302 determines whether this news information has a higher degree of importance than news information whose order was originally to be reported next (step S409). If the freshly acquired news information has a higher degree of importance ("YES" at step S409), then the freshly acquired news information is made to interrupt the flow of information and is provided to the user preferentially (step S410). If the importance of this information is not high ("NO" at step S409), on the other hand, then the information-provision execution unit 302 delivers the freshly acquired news information to the default-news management unit 301 and control proceeds to step S405.

The degree of importance of news information is evaluated in the following manner, by way of example: Information of the kind shown in FIG. 10 is retained in the news-subscriber computer 102 in advance as information indicating the interests of the user. FIG. 10 is a list of keywords representing the user's interests. The degree of importance of an item of news information can be judged by how many times a keyword in the list appears in the item of news information.

Thus, in accordance with the information processing system of this embodiment, the user can acquire desired news information easily and the latest news in which the user has an interest can be obtained promptly. When freshly arriving news is reported, the caster can convey this news upon first uttering the word "Bulletin", or the word "Bulletin" can be appended to a headline on the computer screen, thereby making it possible to clearly notify the user of the fact that this item of news is freshly acquired news. Further, it can be so arranged that the fresh news item is conveyed to the user upon changing the caster animation to one that is exclusively for freshly arriving news.

Second Embodiment

Figure 12:
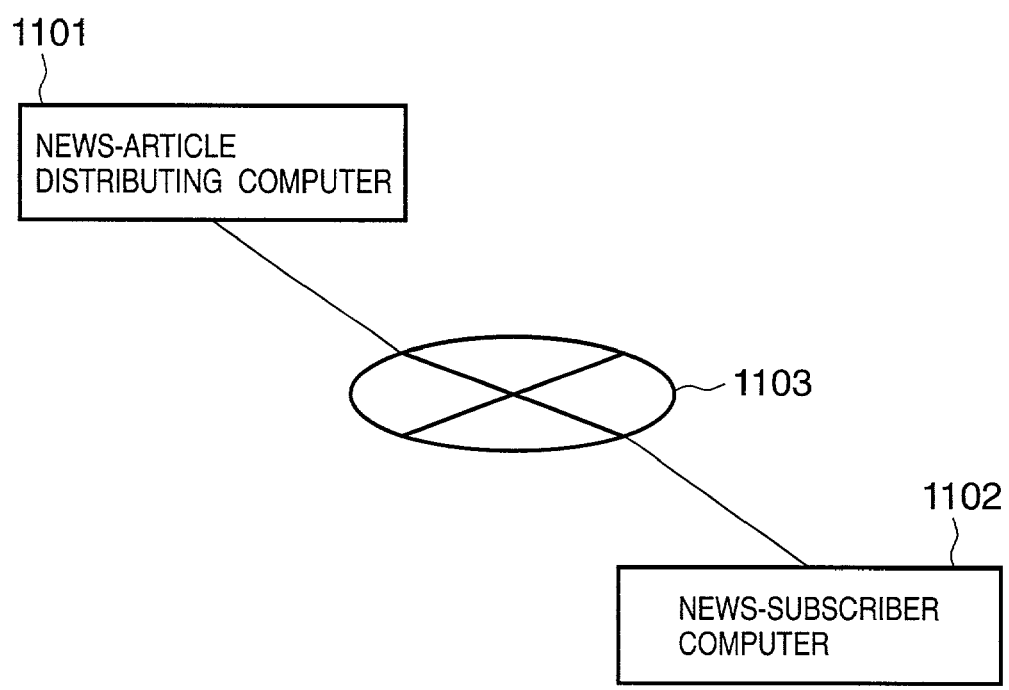
FIG. 12 is a schematic view illustrating an information processing system according to a second embodiment of the present invention.

FIG. 12 is a schematic view illustrating an information processing system according to a second embodiment of the present invention.

The information processing system according to this embodiment comprises a news-article distributing computer 1101 for distributing news information, and a news-subscriber computer 1102 connected for communication via a communication path 1103 such as the Internet for the purpose of receiving distributed news information.

The news-article distributing computer 1101 functions as a server for distributing news information. An example is a general-purpose computer having a communication function.

The news-subscriber computer 1102 is a computer utilized by the user who receives the distributed news information. This also can be a general-purpose computer having a communication function, or a mobile terminal such as a cellular telephone.

Figure 13:
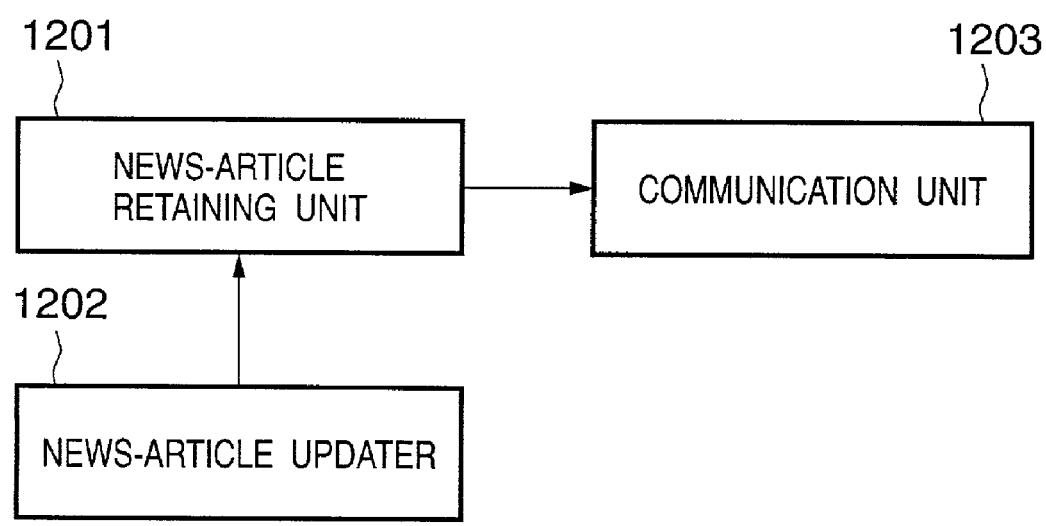
FIG. 13 is a block diagram of functions implemented by a news-article distributing computer according to the second embodiment.

FIG. 13 is a block diagram of functions implemented by the news-article distributing computer 1101. The news-article distributing computer 1101 includes a news-article retaining unit 1201 for retaining news articles provided to the user, a news-article updater 1202 for updating, to the latest news information, the news information retained in the news-article retaining unit 1201, and a communication unit 1203 for transmitting news information retained in the news-article retaining unit 1201 to the news-subscriber computer 1102 via the communication path 1103.

News information that is to be provided is input to the news-article distributing computer 1101 by the provider of news information, whereby the input news information is retained in the news-article retaining unit 1201 and distributed to the news-subscriber computer 1102. The latter can receive this news information at all times by accessing the news-article distributing computer 1101.

Figure 14:
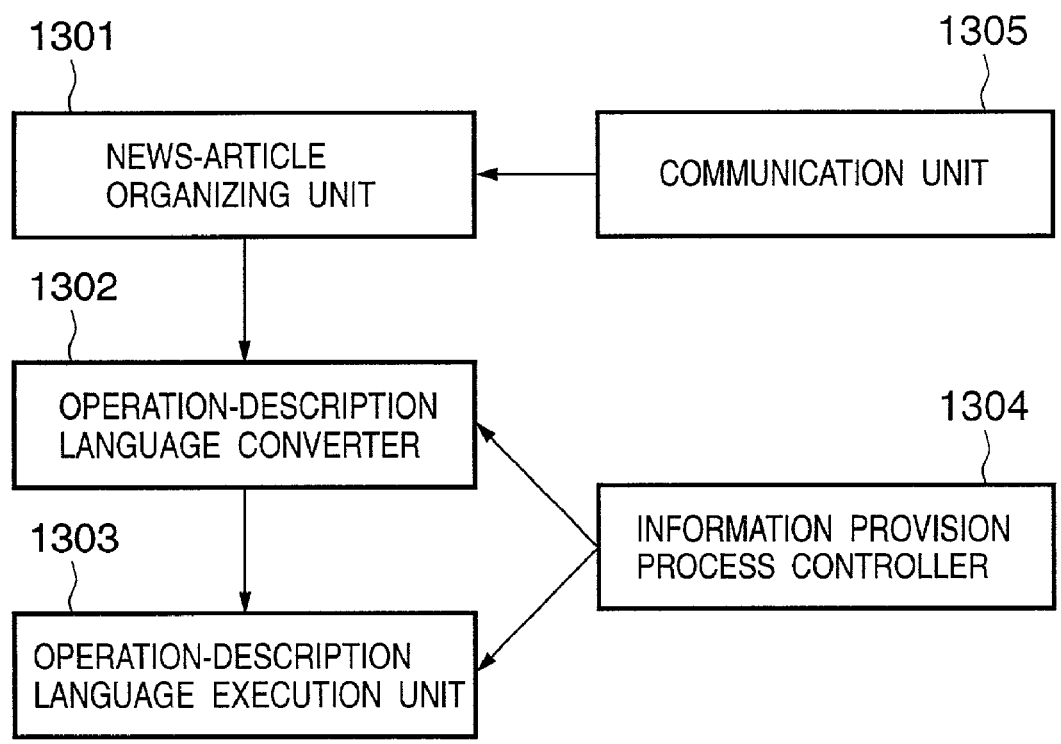
FIG. 14 is a block diagram of functions implemented by a news-subscriber computer according to the second embodiment.

FIG. 14 is a block diagram of functions implemented by the news-subscriber computer 1102. The news-subscriber computer 1102 includes a news-article organizing unit 1301, an operation-description language converter 1302, an operation-description language execution unit 1303, an information provision process controller 1304, and a communication unit 1305.

The news-article organizing unit 1301 stores and manages news information received from the news-article distributing computer 1101. The received news information is classified and managed based upon the information type. In this embodiment, news information is managed by genre, examples of which are politics, business, sports and weather.

The operation-description language converter 1302 creates a document described in operation description language. This document is one that decides the processing executed by the operation-description language execution unit 1303. The document incorporates news information that has been received and shall be referred to as an "operation description document" below. There can be instances in which the incorporated information is the received information per se and instances in which the incorporated information is only necessary data that has been extracted from received news information.

In accordance with the above-mentioned operation description document, the operation-description language execution unit 1303 outputs the content of received news information as voice using voice synthesis and, in conformity with the voice output, displays an animation (referred to as a "virtual caster" below) representing the speaker, such as a newscaster, and displays subtitles and background, etc.

By outputting the content of news information in voice form, the user is capable of recognizing the news information as voice and need not read text. This makes it possible to obtain information in a very easy manner while doing housework or while driving, by way of example.

Further, in accordance with the above-mentioned operation description document, the operation-description language execution unit 1303 receives from the user a designation of news-information genre by voice, executes voice recognition processing to recognize this voice and executes processing for preferentially outputting, in voice form, the content of the news information that belongs to the designated genre.

The information provision process controller 1304 manages the overall process from the start to the end of provision of news information and manages the news genre that is to be reported to the user. In particular, if the user specifies a news genre by voice, the controller 1304 effects a changeover to the news genre that has been specified.

The communication unit 1305 executes communication processing for accessing the news-article distributing computer 1101 via the communication path 1103 and receiving news information.

Figure 15:
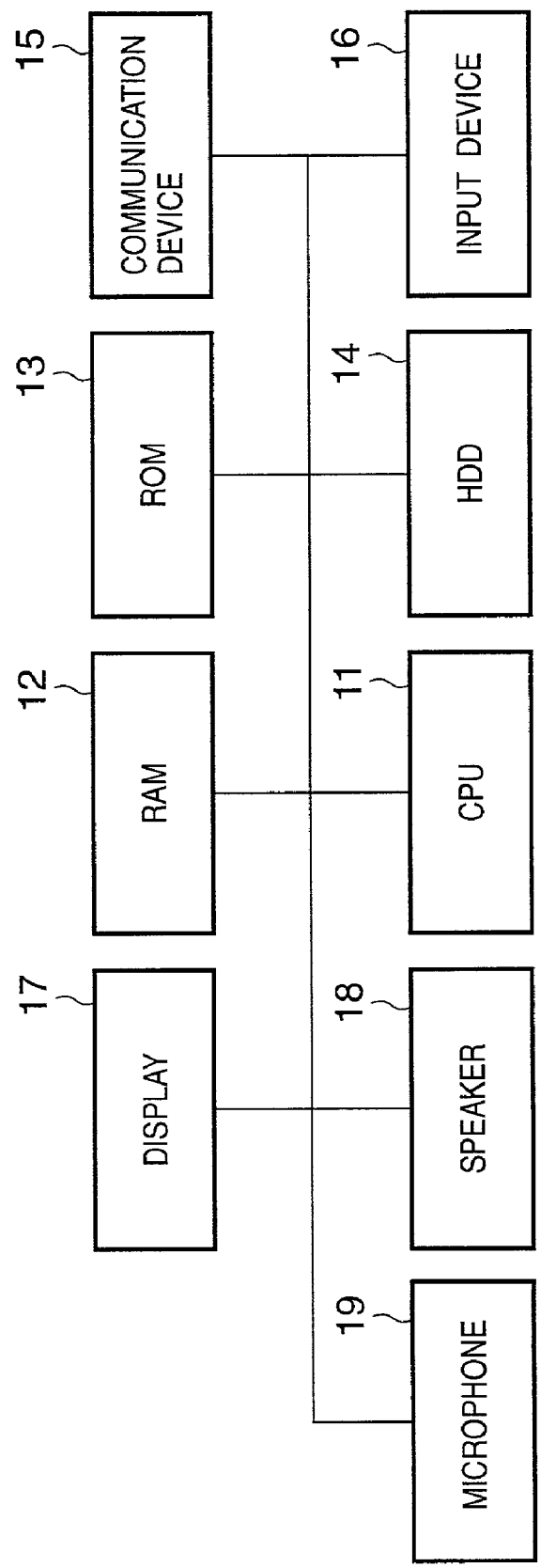
FIG. 15 is a block diagram showing a hardware implementation of the news-subscriber computer according to the second embodiment.

FIG. 15 is a block diagram showing a hardware implementation of the news-subscriber computer 1102. As mentioned above, the news-subscriber computer 1102 can be a general-purpose computer. As shown in FIG. 15, the news-subscriber computer 1102 can include a CPU 11, a RAM 12, a ROM 13 in which the operating program of the CPU 11 has been stored, a hard-disk drive (HDD) 14, a communication device 15 inclusive of a modem or the like for implementing a communication function, an input device 16 such as a keyboard or mouse, a display 17 such as a CRT, a speaker 18 for outputting voice and a microphone 19 that makes it possible to receive a command from the user by voice.

If the function blocks of FIG. 14 and the hardware configuration of FIG. 15 are compared, it will be understood that the news-article organizing unit 1301 can be implemented by the CPU 1 and HDD 4 (which stores received news information), the operation-description language converter 1302 can be implemented by the CPU 11, the operation-description language execution unit 1303 can be implemented by the CPU 11, display 17 (which displays an animation), speaker 18 (which outputs voice) and microphone 19 (which accepts voice commands), the information provision process controller 1304 can be realized by the CPU 11, and the communication unit 1305 can be implemented by the CPU 11 and communication device 15.

FIG. 16 is a flowchart illustrating information processing executed by the news-subscriber computer 1102.

When execution of processing is specified by the user, first the news-subscriber computer 1102 communicates with the news-article distributing computer 1101 and downloads news information. The news information that has been downloaded is stored upon being organized by the news-article organizing unit 1301 in the form shown in FIG. 17 in accordance with the particular genre of this information (step S1401).

Further, at step S1401, the information provision process controller 1304 decides the manner in which news information is provided. This is program creation, so to speak. To accomplish this, the information provision process controller 1304 creates an operation description document form. The operation description document form is an operation description document in which received news information has not been incorporated. In order to create the operation-description document form, definition files created beforehand and shown in FIGS. 18 to 22 are used. It may be so arranged that these files are created by the news-information provider and distributed in conformity with the distribution of the news information, or the files may be retained beforehand on the side of the news-subscriber computer 1102 in accordance with user preference.

FIG. 18 is a file for defining virtual casters. In this embodiment, it is assumed that a plurality of virtual casters exist. Tags "<caster>" to "</caster>" define respective ones of virtual casters, and the name of each virtual caster is defined by "name". On the other hand, "file" specifies a file that defines a speech waveform dictionary, which is used when the voice of the corresponding virtual caster is synthesized, and image data for an animation. The details of the speech waveform dictionary and the details of the data for the animation can be realized using existing techniques and need not be described here.

FIG. 19 is a file that defines the background image of an animation. Tags "<image>" to "</image>" define respective ones of background images, and the name of each background image is defined by "name". On the other hand, "file" specifies an image file.

FIG. 20 is a file that defines the genre of various items of news information. Tags "<newsgenre>" to "</newsgenre>" define respective ones of news genre, and "name" defines the name of the respective news genre. Further, "Caster" specifies the virtual caster that reports the news of the corresponding genre. The value on the right side of "Caster" is defined by "name" included among the tags "<image>" to "</image>" in FIG. 18. Further, "image" specifies a background image when news of the corresponding genre is reported. The value on the right side of "image" is defined by "name" included among the tags "<image>" to "</image>" in FIG. 19.

FIG. 21 is a diagram illustrating an example of a file describing the order of genre of news information provided to a user. Each value is defined by "name" included among the tags "<newsgenre>" to "</newsgenre>" in FIG. 20. In this example, the order of the news genre is "Politics", "Business", "Sports" and "Weather" unless specifically specified otherwise by the user. It goes without saying that the order of news genre can be set by the user at will. By setting the order of the genre in accordance with user preference, the user can obtain the desired news information in the set order of the genre.

Figure 24:
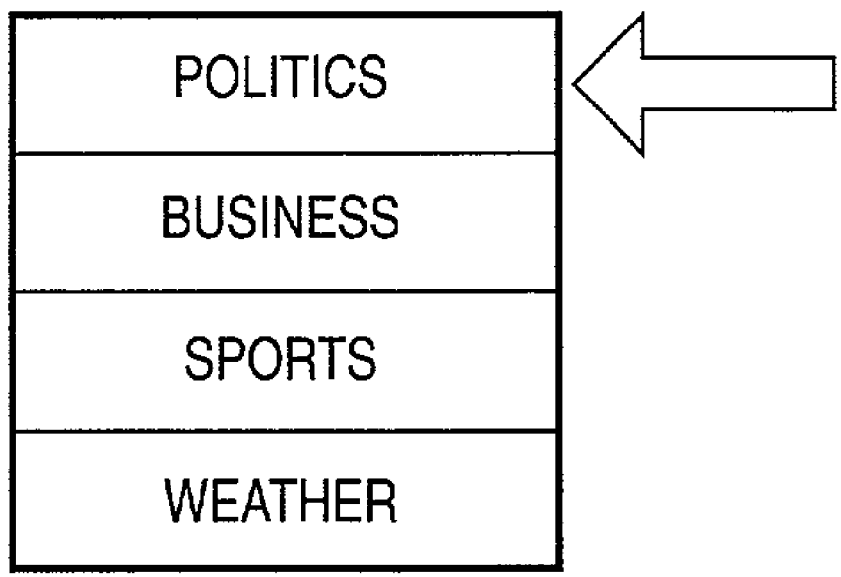
FIG. 24 is a diagram showing an example of a genre table according to the second embodiment.

The information provision process controller 1304 reads in this file and creates a genre table of the kind shown in FIG. 24. The genre table manages the order of the genre of news information output in the form of voice. A pointer (indicated by the arrow in FIG. 24), which indicates the present genre of interest, also is retained.

FIG. 22 is a file that defines recognition vocabulary as well as actions to be taken by a virtual caster in association with each vocabulary item. The tags "<recognize>" to "</recognize>" represent recognition vocabulary. In this example, recognition vocabulary items of 1 to 5 have been defined. The tags "<reaction>" to "</reaction>" indicate actions to be taken, in which "1: genre change: Politics" means that the genre is to be changed to "Politics" and "5: end" means that news is to be ended.

A procedure for providing a user with news information will be described by referring again to FIG. 16.

First, the variable "J" of the news-genre number to be reported to the user and the variable "I" of the article number assigned for each item of news information are initialized (step S1402).

Next, the operation-description language converter 1302 converts news information, which has been specified by article I of genre J, to an operation description document. More specifically, the operation-description language converter 1302 creates the operation description document by incorporating news information in the above-described operation description document form.

First, if variable J=1, variable I=1 holds, then this indicates the initial item of news information of the "Politics" genre and, hence, an operation description document shown for example in FIG. 23 is created from the news information illustrated in FIG. 17. Each line of the operation description document shown in FIG. 23 is generated as follows:

From FIG. 20, the virtual caster that reports "Politics" is "mainCaster" and therefore an operation that causes "mainCaster" to appear is written ["Caster→Show (mainCaster)"]. Since the background image of "Politics" is "Default", an operation for displaying the "Default" image as background is written ["BackgroundImage→Display (Default)"]. Next, an operation for displaying the headline character string of this items of news information is written ["FrontText→Display (Opposition Party Reacts to Prime Minister's Announcement of Tax-Reduction Policy)"]. Next, an operation that causes the virtual caster to read the content of the article is written ["Caster→Speak (Prime Minister—announced that a 'substantial tax-cut' would be put into force next year . . . )"].

Next, the operation-description language execution unit 1303 implements, line by line, the operation description document thus created (S1404). In this embodiment, the user would first be provided with the news information "Headline: Opposition Party Reacts to Prime Minister's Announcement of Tax-Reduction Policy" of the "Politics" genre in FIG. 17.

Figure 28:
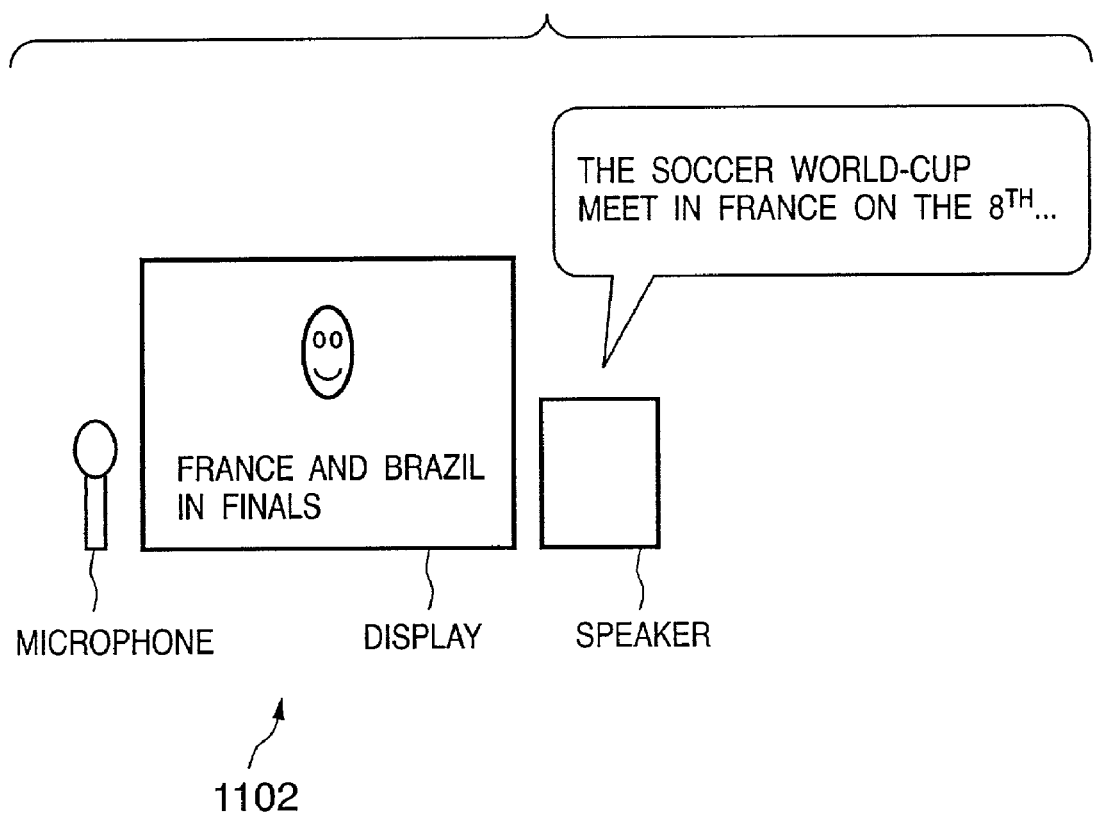
FIG. 28 is a diagram illustrating the manner in which the news-subscriber computer provides news information to a user.

FIG. 28 is a diagram illustrating the manner in which the news-subscriber computer 1102 provides news information to a user. The content of the news information is output as voice from the speaker, and virtual caster is displayed on the display to match the voice output.

Whenever one line of the operation description document is executed, the operation-description language execution unit 1303 checks to see whether there is a voice input from the user (S1405). If there is no voice input ("NO" at step S1405), the operation-description language execution unit 1303 checks to see whether the current line is the last line (S1406). If the current line is not the last line ("NO" at step S1406), then the operation-description language execution unit 1303 proceeds to the next line (S1409) and executes this line. If the current line is the last line ("YES" at step S1406), the unit 1303 determines whether this item of news information is the final item of news information that belongs to the genre J (S1407). If this news information is not the final item of news information ("NO" at step S1407), then the unit 103 proceeds to the next item of news information (S1410).

If it is found at step S1407 that the item of news information is the final item of news information, then the unit 1303 determines whether the genre J is the final genre by referring to the genre table shown in FIG. 24 (S1408). If the genre is not the final genre ("NO" at step S1408), then the unit 1303 advances the pointer of the genre table by one and proceeds to the next genre (step S1413). If the genre is the final genre ("YES" at step S1408), then processing is exited.

If it is determined at step S1405 that there is a voice input from the user, ("YES" at step S1405), then the operation-description language execution unit 1303 subjects this voice input to voice recognition processing. As a result, input voice from the user is collected from the microphone shown in FIG. 28, by way of example.

On the basis of the results of voice recognition, the operation-description language execution unit 1303 acquires numbers defined by tags "<recognize>" to "</recognize>" in FIG. 22. The operation-description language execution unit 1303 then uses each acquired number as a key to find the next process defined in the tags "<reaction>" to "</reaction>".

For example, if entered voice is "Thank you", this corresponds to "5: end" and number 5 is acquired, as shown in FIG. 22. In this case, end of processing is decided at step S1412 and all processing is ended.

If entered voice is, e.g., "Weather", on the other hand, this corresponds to "4: genre change" and number 4 is acquired, as shown in FIG. 22. In this case, the user is to specify the genre of news information and control therefore proceeds to step S1411, where the genre of the news information output as voice is changed over. As a result, the news information that belongs to the genre specified by the user is provided to the user preferentially.

Figure 25:
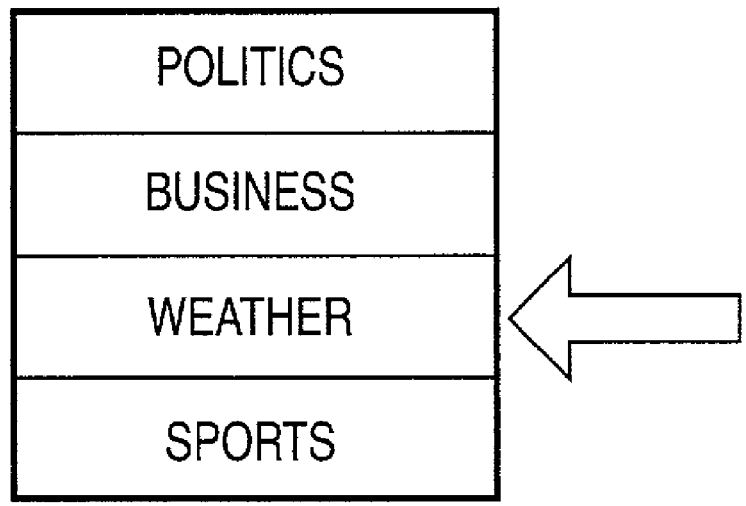
FIG. 25 is a diagram showing an example of an updated genre table according to the second embodiment.

Specifically, the genre table shown in FIG. 24 is updated. For example, in a case where voice is input by the user and, as a result of voice recognition, the processing "4: genre change" is executed when provision of the news information that belongs to the "Politics" genre has finished being provided and the news information that belongs to the "Business" genre is being provided to the user, the genre table is updated as shown in FIG. 25. That is, the pointer is shifted to the "Weather" genre specified by the user and the "Sports" genre, whose news information has not yet been provided, moves to the bottom the table.

After the changeover is thus made to the specified genre, control returns to step S1403 and provision of news information is continued. An arrangement may be adopted in which the genre changeover is performed after one item of news information is provided, thereby providing news information belonging to the new genre immediately, or an arrangement may be adopted in which the genre changeover is performed after the provision of all news information that belongs to the genre that prevailed when the user made the genre specification, as a result of which the news information of the new genre is provided subsequently.

Thus, in accordance with the information processing system of this embodiment, the user is capable of acquiring desired news information very easily and, in particular, is capable of quickly obtaining news information of genre in which the user is interested.

In this embodiment, an example in which the information provision process controller 1304 and operation-description language converter 1302 are implemented by the news-subscriber computer 1102 is illustrated. However, an arrangement may be adopted in which these are implemented by the news-article distributing computer 1101.

Figure 26:
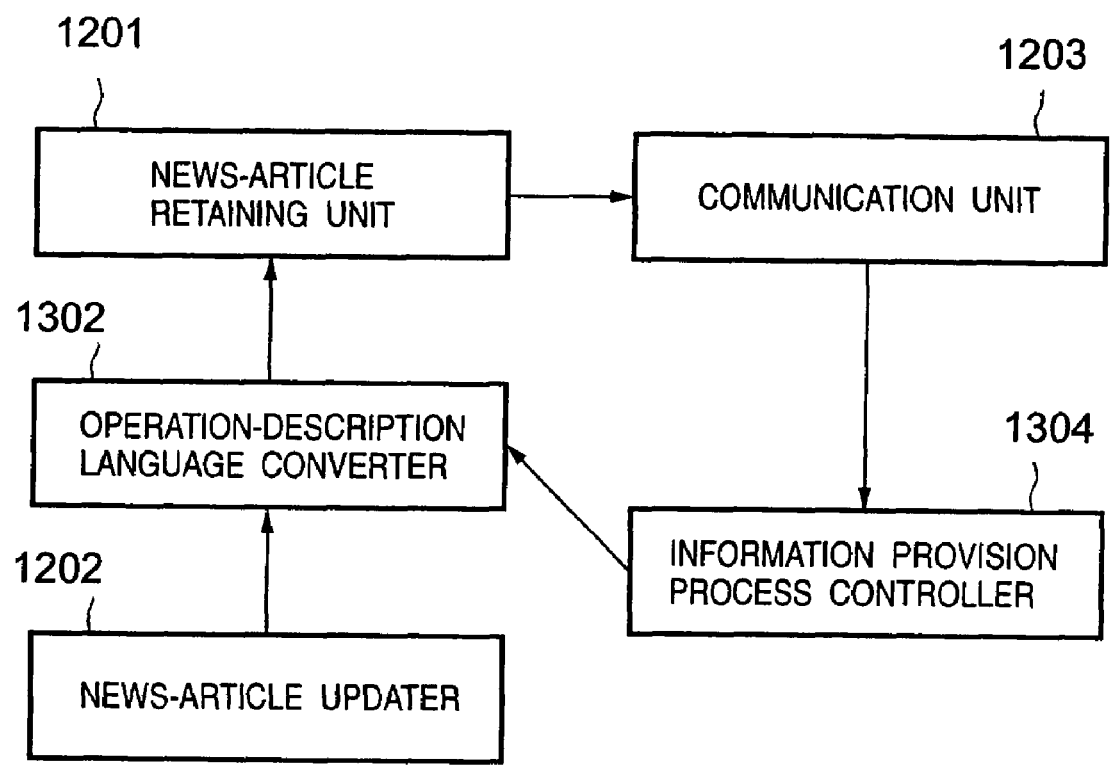
FIG. 26 is a block diagram of functions implemented by a news-article distributing computer according to a third embodiment.
Figure 27:
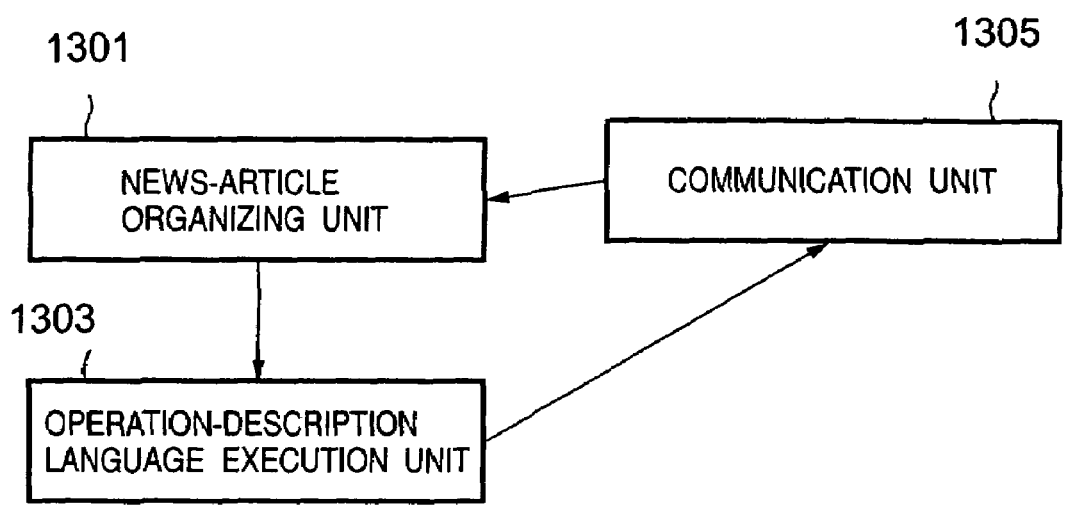
FIG. 27 is a block diagram of functions implemented by a news-subscriber computer according to the third embodiment.

FIG. 26 is a block diagram of functions implemented by the news-article distributing computer 1101 according to the third embodiment, and FIG. 27 is a block diagram of functions implemented by the news-subscriber computer 1102 according to the third embodiment.

In this embodiment, news information is converted to an operation description document by the news-article distributing computer 1101, and the operation description document is distributed to the news-article distributing computer 1101 via the communication path 1103. The distributed operation description document is implemented by a operation-description language execution unit 1502 in the news-subscriber computer 1102, whereby the news information is provided to the user.

In a case where the user enters voice specifying the genre of news information, the operation-description language execution unit 1502 reports the results of voice recognition to the news-article distributing computer 1101 via the communication path 1103.

The news-article distributing computer 1101 receives the results of voice recognition, changes over the genre in accordance with these results and, in order to provide the user with news information while giving priority to news information belonging to a genre specified by the user, creates an operation description document based upon the news information belonging to the specified genre and distributes this document to the news-subscriber computer 1102.

Preferred embodiments of the present invention are as described above. It goes without saying that the object of the invention is attained also by supplying a program of the software for implementing the functions of the foregoing embodiments to a system or an apparatus, reading the program with a computer (e.g., a CPU or MPU) of the system or apparatus and then executing the program.

In this case, the program itself implements the novel functions of the embodiments and a storage medium storing the program or the program product constitutes the invention. Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion card inserted into the computer or in a memory provided in a function expansion unit connected to the computer, a CPU or the like with which the function expansion card or function expansion unit is equipped performs a part of or the entire process in accordance with the designation of program codes and implements the functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A receiving apparatus, which is communicably connected to a transmitting apparatus that transmits news information that contains text, for receiving the news information from said transmitting apparatus, comprising:

receiving means for receiving the news information from said transmitting apparatus;

news management means for classifying the received news information under genres and retaining the received news information;

voice output means for outputting the text content of the received news information retained by said news management means as a voice in an order predetermined for every genre;

determining means, when said receiving means receives fresh news information, for determining whether or not degree of importance of the content of the fresh news information is higher than that of the content of the news information which is to be outputted next according to the order and retained by said news management means; and display means for displaying an animation, which imitates a speaking individual, in conformity with the output of said voice, wherein when the determining means determines that the degree of importance of the content fresh news information is higher than that of the content of the news information, said voice output means outputs the text content of the fresh news information as a voice preferentially, when the determining means does not determine that the degree of importance of the content fresh news information is higher than that of the content of the news information, said news management means classifies the fresh news information and retains the fresh news information, and said display means displays a caster animation selected from among different caster animations according to the genre of the news information outputted by said voice output means and whether or not the outputted news information is the fresh news information outputted preferentially.

2. The apparatus according to claim 1, wherein the order is capable of being set by a user.

3. The apparatus according to claim 1, wherein it is notified that said voice output means outputs the text content of the fresh news information as a voice preferentially.

4. The apparatus according to claim 3, wherein said voice output means outputs a notification voice indicating that said voice output means outputs the text content of the fresh news information as a voice preferentially.

5. The apparatus according to claim 3, wherein said display means displays a notification indicating that said voice output means outputs the text content of the fresh news information as a voice preferentially.

6. An information processing method comprising:

a step of receiving, via a communication path, news information that contains text from a transmitting apparatus that transmits the news information;

a news management step of classifying the received news information under genres and retaining the received news information;

a voice output step of outputting the text content of the received news information retained in said news management step as a voice in an order predetermined for every genre;

a determining step, when fresh news information is received in said receiving step, of determining whether or not degree of importance of the content of the fresh news information is higher than that of the content of the news information which is to be outputted next according to the order and retained in said news management step; and a display step of displaying an animation, which imitates a speaking individual, in conformity with the output of said voice, wherein when it is determined in said determining step that the degree of importance of the content fresh news information is higher than that of the content of the news information, the text content of the fresh news information is outputted as a voice preferentially in said voice output step, when it is not determined that the degree of importance of the content fresh news information is higher than that of the content of the news information, the fresh news information is classified and is retained in said news management step, and in said display step, a caster animation is displayed, the caster animation being selected from among different caster animations according to the genre of the news information outputted in said voice output step and whether or not the outputted news information is the fresh news information outputted preferentially.

7. A computer storage medium encoded with a computer readable program for causing a computer to operate the following means included in said computer, wherein said computer, which is communicably connected to a transmitting apparatus that transmits news information that contains text, receives the news information from said transmitting apparatus:

receiving means for receiving the news information from said transmitting apparatus;

news management means for classifying the received news information under genres and retaining the received news information;

voice output means for outputting the text content of the received news information retained by said news management means as a voice in an order predetermined for every genre;

determining means, when said receiving means receives fresh news information, for determining whether or not degree of importance of the content of the fresh news information is higher than that of the content of the news information which is to be outputted next according to the order and retained by said news management means; and display means for displaying an animation, which imitates a speaking individual, in conformity with the output of said voice, wherein when the determining means determines that the degree of importance of the content fresh news information is higher than that of the content of the news information, said voice output means outputs the text content of the fresh news information as a voice preferentially, when the determining means does not determine that the degree of importance of the content fresh news information is higher than that of the content of the news information, said news management means classifies the fresh news information and retains the fresh news information, and said display means displays a caster animation selected from among different caster animations according to the genre of the news information outputted by said voice output means and whether or not the outputted news information is the fresh news information outputted preferentially.

* * * * *